United States Patent [19]

Avedian et al.

[11] Patent Number: 4,472,887
[45] Date of Patent: Sep. 25, 1984

[54] SYSTEM AND METHOD FOR DEHYDRATING PRODUCE

[75] Inventors: Aaron M. Avedian; Lonald H. Jensen, both of Visalia, Calif.

[73] Assignee: Tagus Ranch, Visalia, Calif.

[21] Appl. No.: 449,600

[22] Filed: Dec. 14, 1982

[51] Int. Cl.³ .................... F26B 3/00; F26B 19/00; F27D 3/00; F27B 9/02

[52] U.S. Cl. ...................................... 34/31; 34/212; 34/216; 34/219; 34/236; 432/11; 432/128; 432/144; 432/152; 432/222

[58] Field of Search ............... 432/128, 136, 137, 140, 432/144, 152, 185, 222, 11; 34/212, 213, 216, 219, 236, 31

[56] References Cited

U.S. PATENT DOCUMENTS

| | | | |
|---|---|---|---|
| 1,539,230 | 5/1925 | Anderson | 34/213 |
| 1,841,813 | 1/1932 | Houlis | 432/247 |
| 2,521,081 | 9/1950 | Morrison | 34/77 |
| 2,920,398 | 1/1960 | Liljenstrom | 34/216 |
| 2,974,387 | 3/1961 | Tomkins | 432/137 |
| 3,186,697 | 6/1965 | Haedike et al. | 432/222 |
| 3,351,329 | 11/1967 | Thomas | 432/144 |
| 3,676,937 | 7/1972 | Janson | 34/46 |
| 3,752,897 | 8/1973 | Atsukawa | 432/128 |
| 3,892,307 | 7/1975 | Scholl | 432/137 |
| 3,965,696 | 6/1976 | Thomason | 62/324 |
| 4,145,820 | 3/1979 | Fehlhaber et al. | 34/75 |
| 4,189,849 | 2/1980 | Vander Schoot | 34/236 |
| 4,192,516 | 3/1980 | McCort | 432/140 |
| 4,250,629 | 2/1981 | Lewis | 34/13.8 |
| 4,257,169 | 3/1981 | Pierce | 34/27 |
| 4,321,757 | 3/1982 | Van der Blom | 34/23 |

OTHER PUBLICATIONS

Advertising Brochure of Proctor and Schwartz Entitled "Conveyor Dryers, Ovens and Heat Processing Equipment."

Primary Examiner—John J. Camby
Attorney, Agent, or Firm—H. Ross Workman; Rick D. Nydegger; Dale E. Hulse

[57] ABSTRACT

A large scale, industrial system and method for dehydrating fruits, nuts or other produce. The system includes two long air tunnels which are placed end-to-end. Each air tunnel has a conveyor which is used to transport the produce through the air tunnel. As the produce exits one air tunnel, it is dropped from one conveyor onto the other, thus permitting the produce to be turned over before it enters the second air tunnel. Each air tunnel is divided into a number of separate air chambers in which the heated, circulating air is confined so as to reduce heat loss, thus increasing the energy efficiency of the system, and also providing for separate control of the air temperature and humidity levels in each air chamber. Countercirculation of air between adjacent air chambers aids in confining the air through the separate air chambers, as well as the use of resilient flaps which are used to enclose the ends of each air chamber through which the conveyor enters and exits. A high volume rate of air flow is directed generally parallel to the direction in which the produce is transported through the air chamber, thereby enhancing the dehydration process.

44 Claims, 6 Drawing Figures

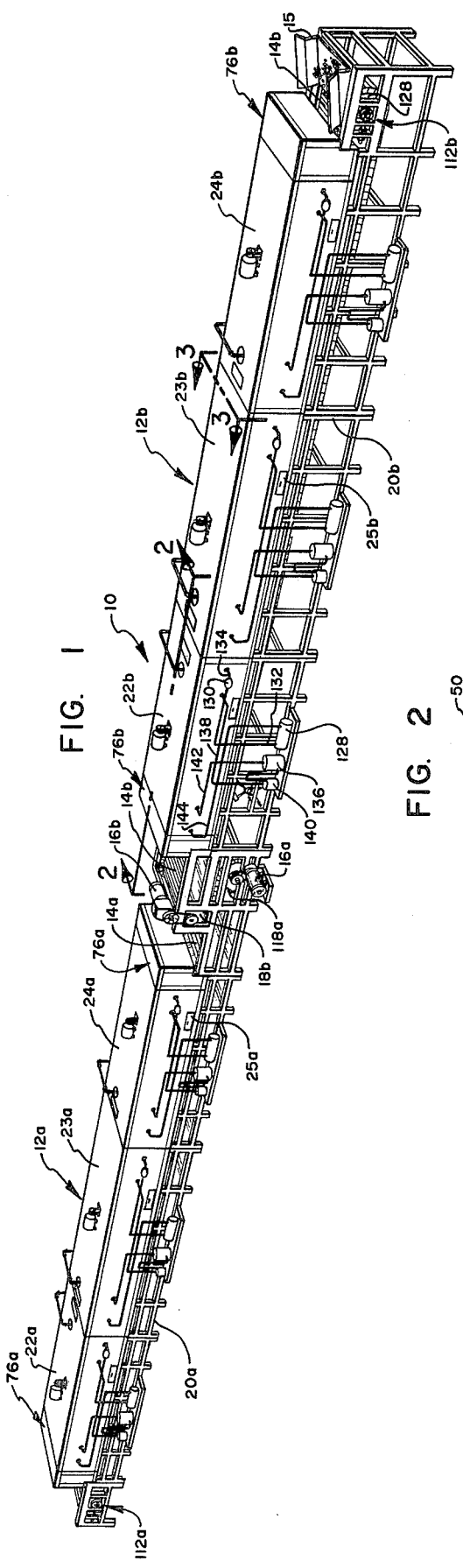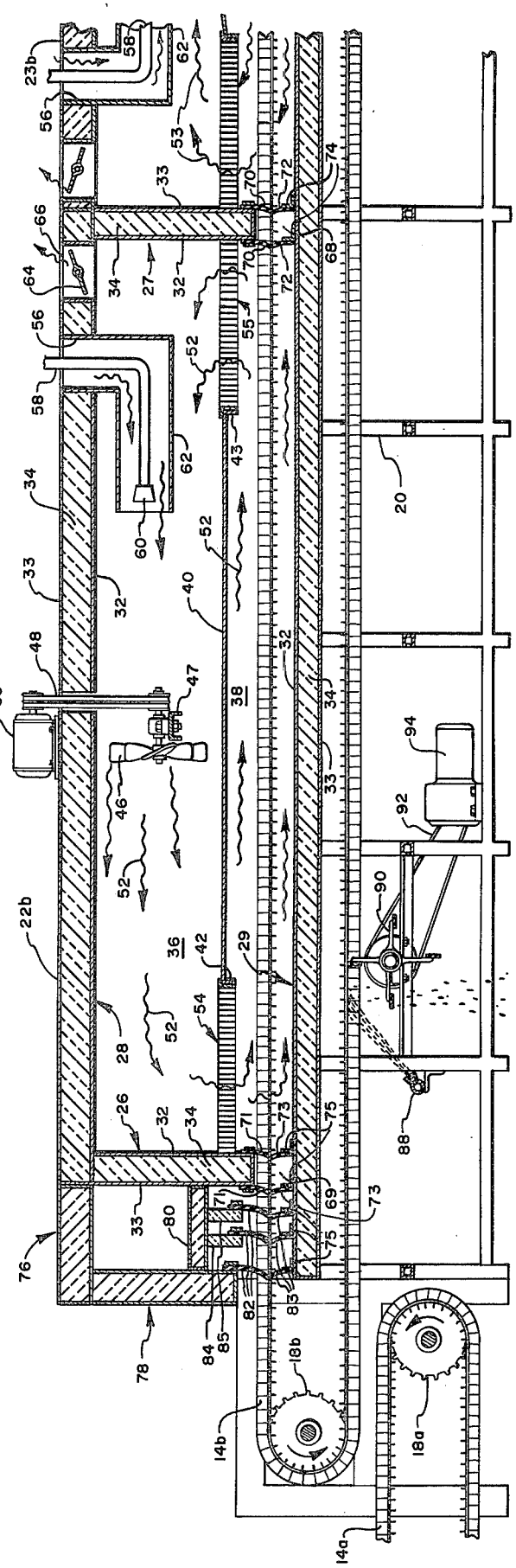

SYSTEM AND METHOD FOR DEHYDRATING PRODUCE

BACKGROUND

1. Field of the Invention

The present invention relates to a drying apparatus and method and, more particularly, to a large scale industrial system and method for dehydrating fruits, nuts and other produce.

2. The Prior Art

Dehydration has long been used as a means of preserving certain types of fruits, nuts, and other produce. In addition, dehydration is also an important process in the preparation of certain types of widely used fruit products such as raisins, prunes, or the like.

Presently, there are a number of different ways which are used to effect large scale commercial dehydration of produce. For example, raisin growers have long used a method of dehydrating raisins which consists simply of spreading paper between the rows of grapevines and then picking the grapes and placing them on the papers on the ground between the rows. The grapes are then left over a period of several weeks and, during the heat of the day the grapes are dehydrated. The grapes must be periodically turned over by hand to insure that the product is thoroughly dehydrated and to minimize spoiling.

Obviously, this method has some very significant drawbacks. In the first place, the method is only usable in climates which are warm enough to accomplish the necessary dehydration. Second, the method suffers from the very serious disadvantage of being entirely dependent upon the weather. For example, if the dehydration process is interrupted by rain, most of the raisin crop may be lost. The method is further disadvantageous because it is not subject to control with respect to parameters such as temperature, humidity and the like. Thus, it is not possible to control with any degree of certainty the quality and uniformity of the raisins produced using this method.

Another system which has commonly been used by fruit and nut growers consists basically of a large wind tunnel in which the produce is stacked in trays up to a height of about six or seven feet. A very large, industrial type gas burner is placed in one end of the wind tunnel. When ignited, the burner heats the air at the incoming end of the tunnel and a fan is then used to force the heated air through the stacked trays of produce. As the heated air leaves the stacked produce it exits through the open end of the tunnel.

This type of dehydration system eliminates the uncertainty of having to rely on weather conditions for purposes of dehydration, and for this reason is a much more desirable system. However, this type of system also suffers from some substantial drawbacks. For one thing, with the rising cost of energy (for example, the cost of natural gas has doubled in the last two years), a tremendous expense is associated with the operation of the large, industrial size burners which are used to heat the air before it is forced through the stacked trays of produce. Indeed, many fruit and nut growers are finding the energy costs of this type of system to be so prohibitive that they are simply unwilling to bear these costs and have gone back to the more primitive method of dehydration as discussed above.

This type of system suffers from the further disadvantage that the air flow through the stacked trays may be very unevenly distributed. For example, if one tray in the stack is loaded with more fruit, air flow across that tray will be impeded. Thus, typically the air temperature will vary from the top of the stacked trays to the bottom of the stack and the moisture content of the air will also vary through the length of the stacked trays of produce. The results is that even with this type of system it is extremely difficult to produce raisins, prunes and other types of dehydrated fruits or nuts which consistently have a high quality. This further increases the waste and thus further reduces the cost effectiveness of this type of dehydration system.

What is needed in the art is a large scale, industrial system and method for dehydrating fruits, nuts or other produce which is highly energy efficient and which can also be controlled with greater precision so that a consistently high quality dehydrated product can be produced without undue expenditure of energy.

OBJECTS AND BRIEF SUMMARY OF THE INVENTION

A primary object of the present invention is to provide a large scale industrial system and method for dehydrating produce which is highly energy efficient such that raisins, prunes and other similar kinds of dehydrated products can be efficiently and inexpensively produced.

Another important object of the present invention is to provide a system and method for dehydrating produce which allows for much greater precision in terms of controlling the conditions such as temperature and humidity which are necessary to produce a high quality dehydrated product.

Yet another important object of the present invention is to provide a system and method for dehydrating produce which can be highly efficiently operated using energy either in the form of natural gas, or electricity, or both.

Still another object of the present invention is to provide a system and method for dehydrating produce which is easy to maintain and operate.

These and other objects and features of the present invention will become more apparent from the following drawings and description, taken in conjunction with the appended claims.

In accordance with the foregoing objects, the present invention provides a system and method for large scale, industrial dehydration of fruits, nuts and other produce. The presently preferred embodiment of the system includes two long air tunnels which are placed end-to-end. Each air tunnel has a conveyor which extends from one end to the other. Produce is transported through the air tunnels by means of the conveyors. At the ends where the air tunnels meet, the conveyors overlap so that as the produce exits from one air tunnel, it falls off the first conveyor onto the second conveyor, thus automatically turning the produce over as it enters into the second air tunnel to complete the dehydration process.

Each air tunnel includes a plurality of essentially separate air chambers. Each air chamber is divided into an upper chamber and a lower chamber and air is heated as it is circulated from the upper to the lower chamber. The air is circulated so that it flows in a generally parallel direction with respect to the direction in which the conveyor transports the produce through the air tunnel. The circulating air flow within each air chamber is confined, thus providing the ability to separately control the air temperature and humidity of each separate air chamber. Each air chamber is advantageously designed so that the circulating air within the air chamber can be heated in a highly efficient manner using either natural gas or electrical energy. This serves to greatly increase the versatility of the dehydrator of the present invention since there are some areas of the country where natural gas is more readily available and is thus a cheaper fuel source than electricity, whereas there may be other parts of the country where electricity may be a more readily available energy source.

BRIEF DESCRIPTION OF THE DRAWING

Reference is next made to the drawing, in which like parts are designated with like numerals throughout, and in which:

FIG. 1 is a perspective view of a large scale industrial dehydrator constructed in accordance with the system and method of the present invention;

FIG. 2 is an enlarged, longitudinal cross-sectional view of a portion of the dehydrator illustrated in FIG. 1, taken along line 2—2 of FIG. 1;

DETAILED DESCRIPTION OF THE PRESENTLY PREFERRED EMBODIMENT

1. The System

Figure 3:
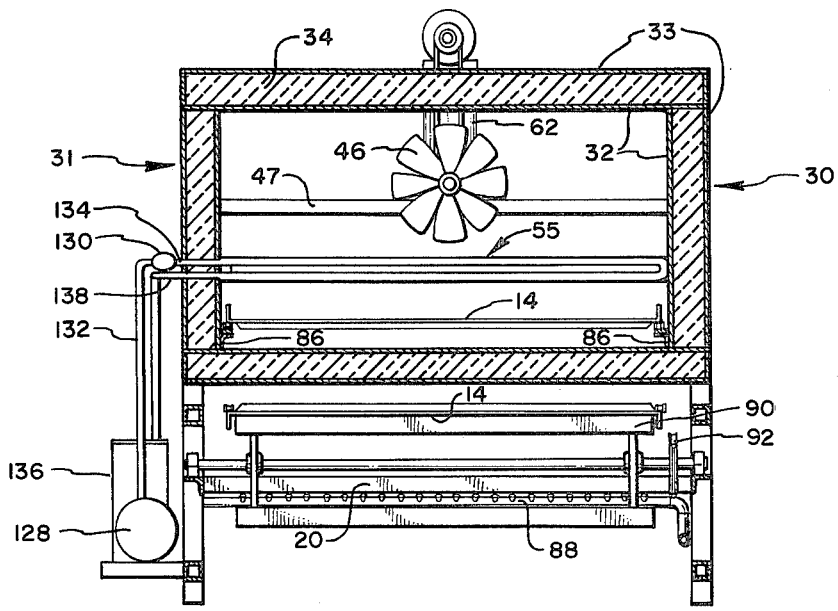
FIG. 3 is an enlarged, end sectional view taken along line 3—3 of FIG. 1.

Referring first to FIG. 1, one presently preferred embodiment of the dehydration system of this invention is generally designated at 10. In the illustrated embodiment, the dehydration system 10 includes two long air tunnels which are generally designated at 12a and 12b and which are placed end-to-end. As hereinafter more fully described, each air tunnel 12 is identically constructed and includes a conveyor 14 which extends from one end of the air tunnel 12 to the other. Each conveyor 14 is driven by a corresponding sprocket 18 which in turn is driven by an electric motor 16.

With continuing reference to FIG. 1, each air tunnel 12 and its corresponding conveyor 14 are supported by means of a metal stand 20. In the illustrated embodiment, the stand 20b is designed so that it is taller than the metal stand 20a. This permits the end of the conveyor 14b to overlap the end of the conveyor 14a. Thus, produce is introduced into the dehydration system through an inclined chute 15 which is located at the extreme end near the entrance of the first air tunnel 12b. From the chute 15, the produce falls onto conveyor 14b where it is then transported through the air tunnel 12b over a period of several hours. As shown best in FIG. 2, as the produce exits from the first air tunnel 12b, it will fall off the end of the conveyor 14b, which is placed above the conveyor 14a such that the ends of the two conveyors overlap each other. In this manner, as the produce falls off of conveyor 14b and onto conveyor 14a, the produce is turned over so that the other side of the produce will be exposed as it is transported through the second air tunnel 12a. This helps to ensure that the produce will be uniformly exposed to the desired dehydration process.

With reference again to FIG. 1, each air tunnel 12 consists of a plurality of separate air chambers 22-24. As hereinafter more fully described, each air chamber 22-24 is designed to be essentially enclosed one from the other so that the circulating air which is used to dehydrate the produce is confined to the separate air chambers 22-24. By confining the circulating air to separate air chambers, heat loss is significantly reduced, resulting in much better energy efficiency. It is also possible to individually control the temperature of each air chamber 22-24 as well as the humidity or moisture content of the circulating air. For some kinds of fruits, for example in the case of dehydrating grapes to produce golden raisins, preliminary tests using the dehydration system of this invention indicate that it may be better to increase the level of heat at the beginning of the dehydration process and then reduce the temperature toward the end of the dehydration process so as not to caramelize the raisins, thus leaving them with a light, golden color. Thus, by providing separate air chambers 22-24 in which the air temperature and humidity can be individually adjusted, it is possible to control the dehydration process with a much greater degree of precision so as to produce a much higher quality product.

In the dehydrator system 10 illustrated in FIG. 1, each separate air chamber 22-24 is approximately sixteen to twenty feet in length and is approximately four feet high by six to ten feet wide. Clearly, the length, height and width of the air chambers are matters of design choice which may vary depending upon the needs of a particular user or application.

The construction of the individual air chambers 22-24 is best seen in reference to FIG. 2, which illustrates a longitudinal section of the chamber 22b taken along line 2—2 of FIG. 1. Since each air chamber 22-24 is essentially identical in its construction, for purposes of simplification only the construction of air chamber 22b is specifically illustrated and described herein, it being understood that the other air chambers are essentially the same except as otherwise specifically noted.

As shown in FIG. 2, each air chamber consists of end panels generally designated at 26-27, top and bottom panels generally designated at 28-29 and side panels (see FIG. 3) generally designated at 30-31, respectively. The inner and outer surfaces 32-33 of each of the panels 26-31 are constructed from stainless steel sheet metal or other similar rust-resistant material. If desired, windows 25 (see FIG. 1) may be placed in each side panel 30-31 to permit visual inspection of the produce. An insulating material 34 is enclosed between the inner and outer surfaces 32-33 which, in the illustrated embodiment, may be a polyurethane foam having an insulation factor of approximately R-40. Other suitable types of insulating material could also be used. The heavily insulated panels 26-31 serve to greatly increase the energy efficiency of the dehydrator system 10.

The interior of each air chamber is divided into an upper chamber 36 and a lower chamber 38 by means of a thin metal wall 40. Positioned in the upper chamber 36 near its center is a fan 46, which is supported by a metal bracket 47 and which is driven by means of a fan belt 48 and motor 50. As hereinafter more fully described, the fan 46 forces air to circulate from the upper chamber 36 to the lower chamber 38, where it dehydrates the produce carried by conveyor 14. The air is circulated parallel to the direction in which the produce is transported, which, as described below, greatly improves the efficiency of the system.

In the illustrated embodiment, fan 46 may be, for example, a tube or vane axial fan capable of providing a volumetric flow rate of approximately 12,000 to 20,000 cubic feet per minute (cfm). While it is important to provide a very high rate of air flow in order to provide efficient dehydration of the produce, the size of the fan 46 is also a matter of design choice which could be varied. The fan 46 is used to provide forced air circulation as schematically represented by the arrows 52.

With continuing reference to FIG. 2, condensing and evaporating coils generally designated at 54-55 are supported at the opposite ends 42-43 of the wall 40 which divides the upper and lower chambers 36-38. Air enters the lower chamber 38 from the upper chamber 36 through the openings provided between the fin tubes 57 (see FIG. 6) of condensing coil 54, and the circulating air is returned from the lower chamber 38 to the upper chamber 36 through the openings provided between the fin tubes 59 of in the evaporating coil 55. In the illustrated embodiment, the coils 54-55 are constructed from seven-eighth inch copper tubes which are provided with approximately ten aluminum fins (not shown) per square inch. The coils 54-55 are, in the illustrated embodiment, rated at approximately 110,000 British thermal units (BTUs). The particular size and construction of the coils 54-55 may be varied as a matter of design choice depending upon the desired air temperature and volume of air flow to be provided in the air chamber.

Figure 6:
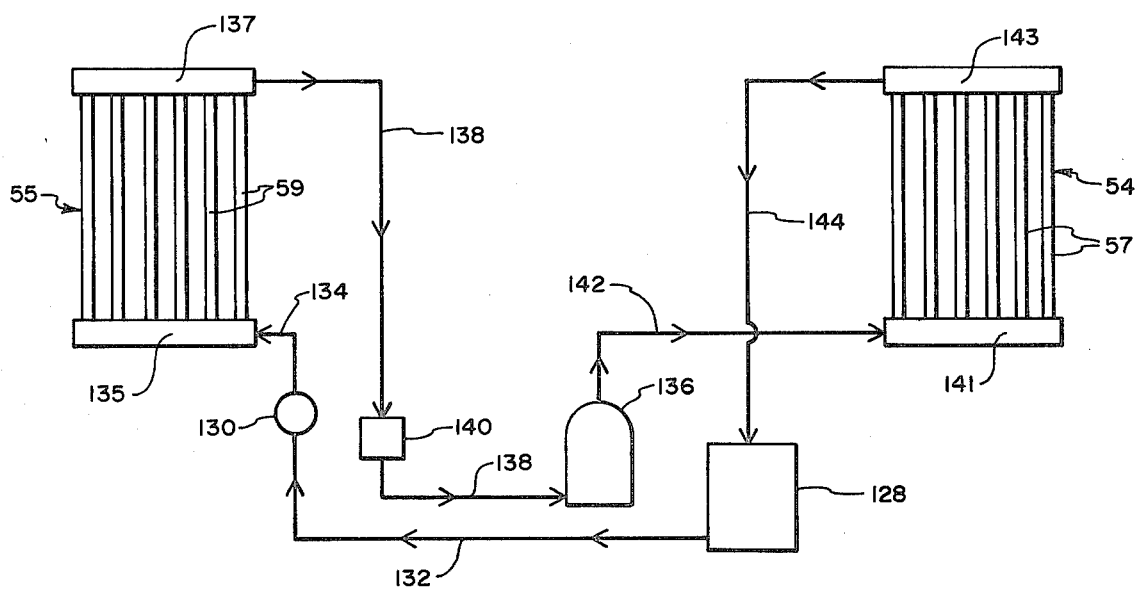
FIG. 6 is a schematic diagram illustrating one presently preferred system for heating the air which is circulated in the separate air chambers of the dehydrator, in accordance with the system and method of the present invention.

As hereinafter more fully described, the condensing and evaporating coils 54-55 may be used as a heat exchange system to impart heat to the circulating air 52 by means of a liquid refrigerant, for example Freon, which is circulated through the coils 54-55 at approximately 350-400 pounds per square inch (psi). As shown in FIGS. 1, 3, and 6 the refrigerant which is circulated through the condensing and evaporating coils 54-55 is supplied by a receiver 128 which is connected through a first length of conduit 132 to a direct expansion valve 130, from which the refrigerant is introduced through a small length of conduit 134 into the coil 55. Expansion valve 130 may be, for example, a model PFE-12 direct expansion valve manufactured by Sporlan Valve Co. of St. Louis, Mo., or a suitable equivalent. The outlet 137 (FIG. 6) of the evaporating coil 55 is coupled through a second length of conduit 138 to a conventional accumulator 140, and from there to a compressor 136.

In the preferred embodiment, compressor 136 is a rotary compressor, model K63C605B manufactured by Rotorex Company of Frederick, Md. The inlet 141 (see FIG. 6) of the condensing coil 54 is connected through a third conduit 142 which leads to the compressor 136, and the outlet 143 of the condensing coil 144 is connected by a fourth conduit 144 to the receiver 128.

With reference to the schematic diagram of FIG. 6, as the high pressure refrigerant leaves the receiver 128 through conduit 132, its pressure is reduced by the direct expansion valve 130 and it is introduced into the evaporating coil 55. The refrigerant then circulates at a temperature of approximately 140 to 145 degrees Fahrenheit through the tubes 59 of the evaporating coil 55 and as the circulating air passes from the lower chamber 38 through the evaporating coil 55 (See FIG. 2) back to the upper chamber 36, heat is exchanged from the returning air to the refrigerant. The refrigerant then passes from the evaporating coil 55 through the conduit 138 to an accumulator 140 and from there to the rotary compressor 136. Compressor 136 increases the pressure and temperature of the refrigerant, which is then circulated at a temperature of about 170 to 180 degrees Fahrenheit through the condensing coil 54. As the hot, high pressure refrigerant is circulated through the condensing coil 54, the air which passes from the upper chamber 36 through the coil 54 and into the lower chamber 38 is heated, so that it is maintained at a temperature of about 160 degrees Fahrenheit. The refrigerant is then returned via conduit 144 back to the receiver 128 where the process is repeated. In this manner, it is possible to provide a highly efficient method of heating the circulating air. As hereinafter more fully described, this method of heating the circulating air may be used either by itself, or in conjunction with a gas burner 60 (see FIG. 2) which may be located in the upper chamber 36.

With reference again to FIG. 2, an air intake 56 is provided through the top of the upper chamber 36. A pipe 58 which terminates in a small burner 60 is inserted through the air intake 56 and is positioned near the fan 46. Pipe 58 and burner 60 are surrounded by a diametrally enlarged fresh air inlet tube 62 which is elbow-shaped. The inlet tube 62 may be extended somewhat past the end of the burner 60 so that the moisture-laden air which is returned from the lower chamber 38 will not interfere with the combustion at the burner 60. Thus, relatively dry air taken in through the fresh air inlet tube 62 is used for the combustion of burner 60 which in turn is used to heat the air 52 circulated by fan 46 from the upper chamber 36 into the lower chamber 38. Moisture-laden air returning from the lower chamber 38 may be expelled through an adjustable baffle 64 which is located in the top of the upper chamber 36 near the end where the moisture-laden air is returned to the upper chamber 36. By adjusting the size of the opening provided by baffle 64, the temperature and moisture content of the circulating air can be controlled by permitting either more or less of the warm, moisture-laden air to escape through the baffle 64, as schematically represented by arrow 66.

The heat exchange system provided by coils 54-55 is typically driven by electrical energy, while the heat provided by burner 60 may be derived by burning natural gas supplied to the pipe 58. In some areas, natural gas may be a more plentiful energy source than electricity. In that case, the coils 54-55 may be replaced by a simple air baffle and the burner 60 may be used as the sole means for imparting heat to the circulating air 52. In other instances, electricity may be a more plentiful energy source and thus the burner 60 may be eliminated such that the heat exchange coils 54-55 are the sole means of imparting heat to the circulating air 52. In other cases, it may be desirable to use both types of energy in combination. Thus, the burner 60 and heat exchange coils 54-55 may be used either together or separately, thus increasing the versatility of the dehydrator system 10.

Referring again to FIG. 2, it will be seen that the end panels 26 and 27 are somewhat shorter in their length than the overall height of the air chamber. Thus, a space 68 is provided between the end panel 27 and bottom panel 29 and a corresponding space 69 is provided between end panel 26 and bottom panel 29. The conveyor 14 enters and exits the air chamber through the spaces 68-69, respectively. A plurality of resilient rubber flaps 70-71 are bolted onto the end panels 27 and 26 at the ends thereof. Corresponding resilient rubber flaps 72-73 are attached to the bottom panel 29 by means of brackets 74 and 75. The flaps 70-73 engage the top and bottom of the conveyor 14 so that the spaces 68-69 provided at the ends of the air chamber are essentially enclosed by the flaps 70-73. The flaps 70-73 are sufficiently resilient that they will bend so as to permit the produce being carried by the conveyor 14 to be transported into and out of the air chamber without undue interference.

As illustrated in FIG. 1, the extreme ends of the air tunnel 12 may additionally include an extension generally designated at 76. As shown in FIG. 1, each extension 76 is constructed from insulated panels generally designated at 77 and 78. Positioned between panels 78 and 26 is a horizontal support 80 which is joined to two small end walls 84-85 to which are attached additional resilient flaps 82. Corresponding flaps 83 are anchored to the bottom panel 29 by means of the brackets 75. The additional resilient flaps 82-83 serve to help ensure confinement of the circulating air 52 in the air chambers 22 and 24 (see FIG. 1) which are at the ends of the air tunnel 12. Advantageously, by confining the circulating air to each separate air chamber, heat loss is reduced and the energy efficiency of the dehydration system is significantly increased. Moreover, the air temperature and humidity of each separate air chamber can be more accurately controlled, which greatly aids in improving the overall quality of the dehydrated produce.

The conveyor 14 which transports the produce through the lower chamber 38 carries the produce in a direction which is generally parallel to the air which is circulated through the lower chamber 38. In practice it has been found that by circulating the air in a direction that is generally parallel to the direction in which the produce is transported through the air tunnel, the dehydration process is improved and the moisture is more efficiently removed. For example, unlike dehydrators which have heretofore been used in the art, the system and method of this invention does not result in large, static air pressures which are caused by forcing the air to circulate through the fruit or through stacked trays of fruit. Rather, the air is circulated in a generally parallel direction across the top of the fruit, thus permitting a much higher volume of air flow to be achieved using a much smaller fan 46 and motor 50. The high volume of air flow (typically 12,000 to 20,000 cfm) permits moisture to be removed more efficiently from the produce with much less expenditure of energy. Thus, the dehydration process is accomplished in a much improved manner.

As shown in the sectional end view of FIG. 3, the conveyor 14 is supported inside the air tunnel by brackets 86 which are attached along the lower inside edges of the air tunnel. As the conveyor 14 leaves the air tunnel and returns it is sprayed with water by a nozzle 88 (see also FIG. 2) and is then scraped by a paddle 90 which is driven by a belt 92 and motor 94. Thus, any produce which sticks to the conveyor 14 is washed or scraped off of the conveyor.

Figure 4:
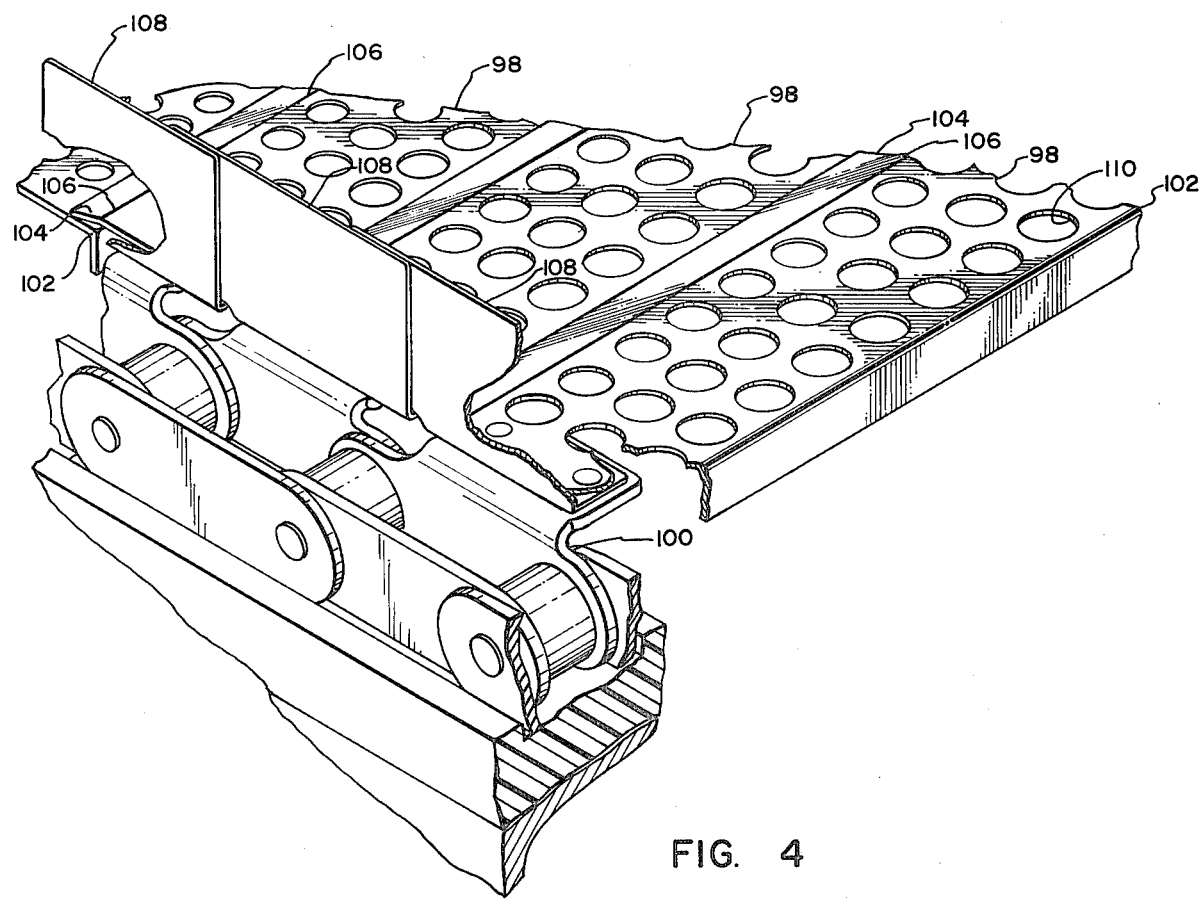
FIG. 4 is a perspective view illustrating in greater detail a portion of the conveyor belt used in conjunction with the dehydrator of the present invention.

As shown in FIG. 4, the conveyor 14 consists of a plurality of sections 98. Each section 98 extends across the width of the conveyor 14 and is riveted or otherwise attached at the opposite ends thereof to a drive chain 100. Each section 98 has a 90 degree bend at one edge 102 thereof so as to provide structural support along the width of the section 98. The other edge 104 is bent as at 106 at a very slight angle and rests along the longitudinal edge of the adjacent section. Vertically bent side members 108 are also riveted to the drive chain 100 at opposite ends of each section 98 so as to provide a vertical side which helps to keep the produce from falling off the sides of the conveyor. Small holes as at 110 may be provided in each section 98 so as to provide maximum exposure of the produce to the circulating air inside of the air tunnel.

Figure 5:
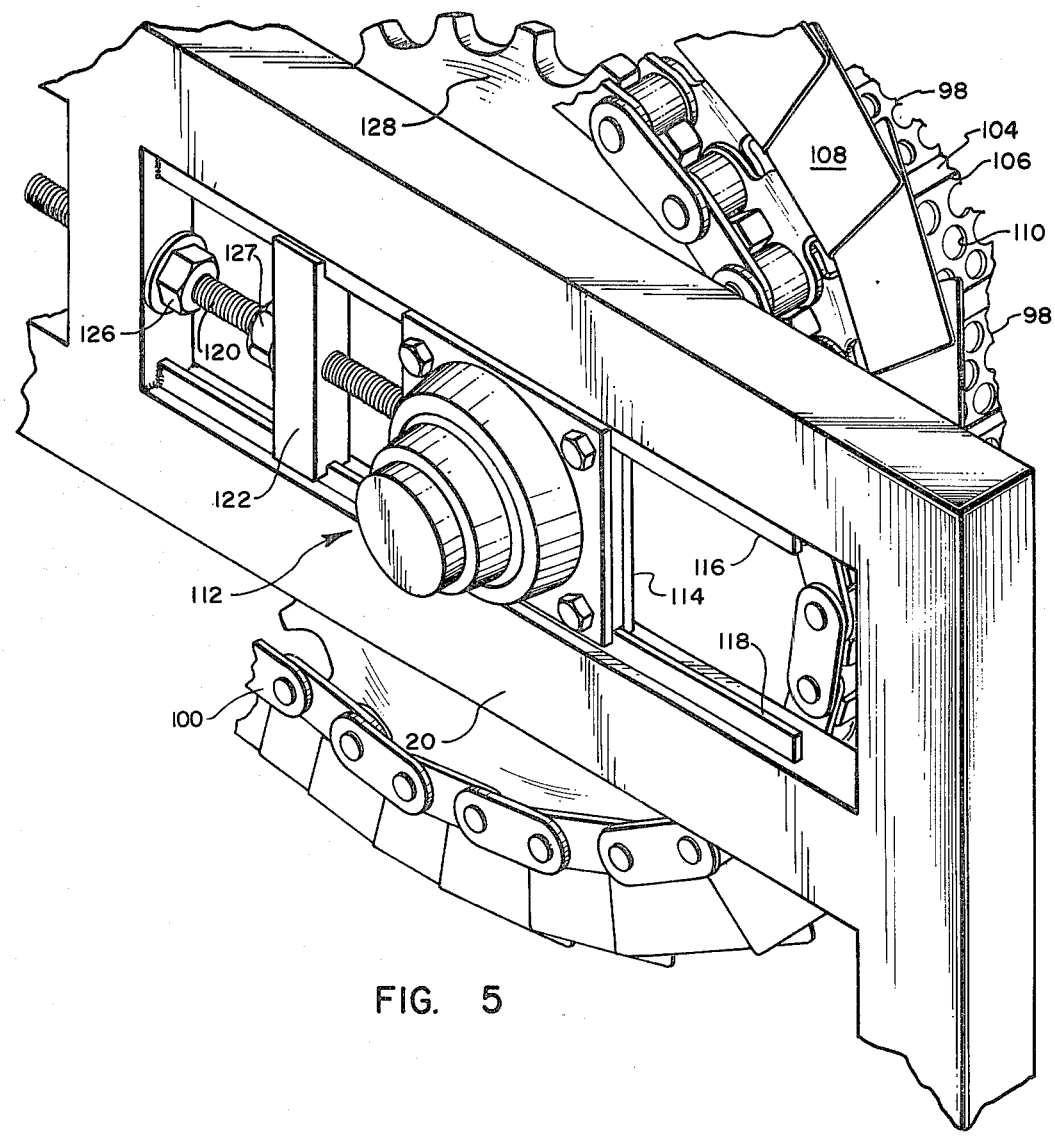
FIG. 5 is a perspective view illustrating in greater detail the tension mechanism used in connection with the conveyor belt of the dehydrator.

The mechanism for adjusting the tension on the conveyor is best illustrated in the enlarged, partial perspective view of FIG. 5. The tension mechanism generally designated 112 (see also FIG. 1) is located at the end of the conveyor opposite the motor 16. The tension mechanism 112 includes a sliding bracket 114 which is attached to the sprocket 128 which engages the drive chain 100. Bracket 114 is mounted on rails 116 and 118 which are welded or otherwise securely joined to the metal stand 20. A threaded rod 120 is mounted through a vertical, slidable support member 122 and is joined at one end to the slidable bracket 114. By adjusting the bolts 126 and 127 the tension exerted on conveyor 14 may be increased or decreased. Of course, other suitable tension mechanisms, as for example a standard "take-up" bearing, could be used.

2. The Method

In the presently preferred method for operating the dehydration system 10 of the present invention, the speed of motors 16a and 16b (see FIG. 1) is set so that the conveyors 14a and 14b will transport the produce through the air tunnels 12a and 12b in anywhere from three to twenty-two hours. The speed at which the produce is transported through the air tunnels 12a and 12b may be varied depending upon the type of produce being dehydrated and the particular requirements in terms of moisture removal necessitated for the selected type of produce. As previously mentioned, the air temperature and humidity of each separate air chamber 22a-24a and 22b-24b may be separately controlled depending upon the type of produce which is being dehydrated. The temperature may be increased or decreased along the length of either air tunnel 12a or 12b, and the humidity level may be increased or decreased by controlling the amount of air expelled through the adjustable baffle 64 (see FIG. 2) of each air chamber 22-24.

It has also been found desirable in the operation of the dehydration system of the present invention to reverse the position of the air intake 56, baffle 64 and fan 46 in the upper chamber 36 so that countercirculation of the confined air will occur between adjacent air chambers of the air tunnel 12. For example, as illustrated in FIG. 2, the air 52 circulated through air chamber 22b circulates in a direction which is opposite to the air 53 which is circulated in air chamber 23b. This counter circulation of the air further aids in confining the circulating air to the separate air chambers 22b and 23b.

Also, in the preferred method of operating the dehydration system 10 the air is circulated in the air chambers 22 and 24 which are located at opposite ends of the air tunnel 12 in a manner such that the air is directed away from the entry and exit openings through which the conveyor 14 runs. For example, as illustrated in FIG. 2 the air 52 is circulated so that as the air enters lower chamber 38, it is directed away from the opening 69 through which the conveyor 14 exits air tunnel 12. This further aids in reducing heat loss.

As mentioned earlier, the circulating air inside each separate air chamber 22-24 is heated either by means of a burner 60 or by means of the heat exchange coils 54–55 or by using the two heating systems in combination. Typically, the air temperature of the air which is circulated through the lower chamber 38 is maintained somewhere on the order of 160 degrees Fahrenheit, but this temperature may be varied depending upon the particular type of produce which is being dehydrated and also depending upon whether it may be desirable to increase or decrease air temperature at the beginning or end of the air tunnels 12a or 12b.

In the preferred method the circulating air inside each air chamber is provided at a relatively high volumetric flow rate on the order of about 12,000 to 20,000 cfm. The air is circulated in a direction which runs generally parallel to the direction in which the produce is transported through the lower chamber 38 on conveyor 14. The parallel air circulation through lower chamber 38 has been found to significantly improve the dehydration process, since it reduces static air pressure which is otherwise caused by forcing the air to blow through the produce, as opposed to across the produce as in the method of this invention. Thus, much higher volumes of air flow can be circulated through the lower chamber 38 while still reducing energy consumption by using smaller fans and motors.

As the produce exits from the first air tunnel 12b, it is dropped off of the conveyor 14b and onto the end of conveyor 14a which is positioned below the end of conveyor 14b so that the produce is turned over as it enters the second air tunnel 12a.

While the system and method of the present invention has been described in reference to the presently preferred embodiment as illustrated and described in connection with FIGS. 1–6, the invention may be embodied in other specific forms without departing from its spirit or essential characteristics. Thus, the described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A system for dehydrating produce comprising:
   means for forming an air tunnel, said air tunnel comprising means for dividing the air tunnel into a plurality of separate air chambers, each said air chamber comprising means for dividing the air chamber into an upper and a lower chamber, and further comprising means for essentially enclosing air flow between adjacent air chambers;
   a continuous conveyor means for transporting said produce through essentially the center portion of said lower chamber of said air tunnel; and
   each said air chamber comprising means for forcing air to circulate from said upper chamber, through said lower chamber both above and below said conveyor means in a direction generally parallel to the direction in which said produce is transported and back to said upper chamber, and means positioned in said upper chamber for heating the circulating air.

2. The system of claim 1 wherein each said air chamber further comprises a plurality of insulated panels which are joined together to form the top, bottom, sides and ends of each said air chamber.

3. The system of claim 2 wherein each said insulated panel comprises outer and inner surfaces constructed from stainless steel, with an insulating material enclosed between said outer and inner surfaces.

4. The system of claim 3 wherein said insulating material comprises polyurethane foam.

5. The system of claim 2 wherein said insulated panels which form the ends of each said air chamber are spaced from the insulated panel which forms the bottom so as to provide a space through which said produce may enter and exit each said air chamber as the produce is transported therethrough.

6. The system of claim 5 wherein said means for essentially enclosing each air chamber comprises a plurality of essentially resilient flaps located at each said space through which said produce enters and exists each air chamber, said flaps confining the air flow within each separate air chamber.

7. The system of claim 1 wherein said means for forcing air to circulate within each said air chamber comprises:
   means for forming openings at opposite ends of said means for dividing each said air chamber into upper and lower chambers, thereby permitting said circulating air to enter and exit the lower chamber at opposite ends thereof; and
   a motor driven-fan positioned within said upper chamber to effect said air circulation.

8. The system of claim 7 wherein said upper chamber comprises:
   means for introducing fresh, relatively dry air from the ambient into said upper chamber; and
   means for expelling moisture-laden air returned to said upper chamber from said lower chamber.

9. The system of claim 8 wherein said means for expelling moisture-laden air comprises an adjustable air baffle located in said upper chamber in proximity to the said opening through which the circulating air exits from the lower chamber into the upper chamber.

10. The system of claim 1 wherein said means for forcing air to circulate are positioned so as to effect countercirculation in at least two adjacent air chambers of said air tunnel.

11. The system of claim 1 wherein said means for forcing air to circulate within the air chambers which are located at opposite ends of said air tunnel are each positioned so as to effect air circulation which is directed away from openings provided at the opposite ends of said air tunnel.

12. The system of claim 7 wherein said means for heating the circulating air comprise a gas-fired burner positioned in said upper chamber in proximity to said fan.

13. The system of claim 12 wherein said upper chamber further comprises a fresh air intake tube which surrounds said burner.

14. The system of claim 7 wherein said means for heating the circulating air comprises:
   means for storing a high pressure refrigerant;
   means for reducing the pressure of said refrigerant so as to vaporize the refrigerant, said means for reducing pressure having an inlet and an outlet, said inlet being connected by a first conduit to said means for storing the refrigerant;
   an evaporating coil having an inlet and an outlet, the inlet of the evaporating coil being connected to said means for reducing pressure, said evaporating coil being positioned at the opening in the end of said upper chamber through which the circulating air exits from said lower chamber to said upper chamber;

means for compressing said refrigerant, said means for compressing having an inlet and an outlet, the inlet of said means for compressing being connected by a second conduit to the outlet of said evaporating coil; and a condensing coil having an inlet and an outlet, the inlet of the condensing coil being connected through a third conduit to the outlet of said means for compressing the refrigerant, the outlet of said condensing coil being connected through a fourth conduit to said means for storing the refrigerant, said condensing coil being positioned at the opening in the end of said upper chamber through which the circulating air enters the lower chamber from the upper chamber.

15. The system of claim 14 wherein said means for compressing said refrigerant comprises a rotary compressor.

16. The system of claim 1 wherein said continuous conveyor means for transporting said produce comprises:

a conveyor belt which extends from one end of said air tunnel to the other;

and means for driving said conveyor belt.

17. The system of claim 16 wherein said conveyor belt comprises a plurality of separate segments, each segment resting on a portion of an adjacent segment along one longitudinal edge thereof.

18. The system of claim 16 further comprising means for washing and scraping said conveyor belt to remove any produce stuck to said conveyor belt after the produce has been transported through the air tunnel and removed from the conveyor belt.

19. The system of claim 1 wherein said air tunnel is a first air tunnel, and wherein said system further comprises means for forming a second air tunnel configurated essentially identical to the first air tunnel.

20. A system for dehydrating produce comprising:

first means for forming a first air tunnel and second means for forming a second air tunnel;

first means for transporting said produce through said first air tunnel, and second means for transporting the produce through said second air tunnel, said first and second air tunnels being placed end-to-end with respect to each other such that a portion of said first and second means for transporting said produce overlap each other, whereby said produce will be turned over as it leaves the first air tunnel and enters the second air tunnel; and means for dividing each of said first and second air tunnels into a plurality of air chambers which are essentially enclosed one from the other as to air circulating in each said chamber, and each said air chamber comprising:

a plurality of insulated panels which are joined together to form the top, bottom, sides and ends of each said air chamber, each said insulated panel comprising outer and inner surfaces constructed from an essentially rigid, rust-resistant materials with an insulating material enclosed between said outer and inner surfaces;

means for dividing the interior of said air chamber into an upper chamber and a lower chamber, said upper chamber having means for forming openings positioned at opposite ends thereof to permit circulating air to enter and exit the lower chamber at opposite ends thereof, thus permitting air to circulate between the upper and lower chambers in a direction generally parallel to the direction in which said produce is transported therethrough;

means for forcing air to circulate between said upper and lower chambers; and means for heating the circulating air.

21. The system of claim 20 wherein said insulated panel which forms the ends of each said air chamber are spaced from the insulated panel which forms the bottom so as to provide a space through which said produce may enter and exit each said air chamber as the produce is transported therethrough.

22. The system as defined in claim 21 wherein each said first and second means for transporting said produce comprise a motor driven conveyor, and wherein each said air chamber further comprises a plurality of essentially resilient flaps located at each said space through which said produce enters and exits each air chamber, said flaps confining the air flow within each separate air chamber.

23. The system as defined in claim 20 wherein said upper chamber comprises:

means for introducing fresh, relatively dry air from the ambient into said upper chamber; and means for expelling moisture-laden air returned to said upper chamber from said lower chamber.

24. The system as defined in claim 23 wherein said means for expelling moisture-laden air comprises an adjustable air baffle located in said upper chamber in proximity to the said opening through which the circulating air exits from the lower chamber into the upper chamber.

25. The system as defined in claim 20 wherein the means for forcing air to circulate of at least two adjacent air chambers are positioned so as to effect counter-circulation in the adjacent air chambers.

26. The system as defined in claim 20 wherein the means for forcing air to circulate in the air chambers which are located at opposite ends of said first and second air tunnels are each positioned so as to effect air circulation which is directed away from the respective end through which said produce enters and exists each said first and second air tunnel.

27. The system as defined in claim 20 wherein said means for heating the circulating air comprise a gas-fired burner positioned in said upper chamber.

28. The system as defined in claim 27 wherein said upper chamber further comprises a fresh air intake tube which essentially surrounds said burner.

29. The system of claim 20 wherein said means for heating the circulating air comprises:

means for storing a high pressure refrigerant;

means for reducing the pressure of said refrigerant so as to vaporize the refrigerant, said means for reducing pressure having an inlet and an outlet, said inlet being connected by a first conduit to said means for storing the refrigerant;

an evaporating coil having an inlet and an outlet, the inlet of the evaporating coil being connected to said means for reducing pressure, said evaporating coil being positioned at the opening in the end of said upper chamber through which the circulating air exits from said lower chamber to said upper chamber;

means for compressing said refrigerant, said means for compressing having an inlet and an outlet, the inlet of said means for compressing being connected by a second conduit to the outlet of said evaporating coil; and a condensing coil having an inlet and an outlet, the inlet of the condensing coil being connected through a third conduit to the outlet of said means for compressing the refrigerant, the outlet of said condensing coil being connected through a fourth conduit to said means for storing the refrigerant, said condensing coil being positioned at the opening in the end of said upper chamber through which the circulating air enters the lower chamber from the upper chamber.

30. The system of claim 29 wherein said means for compressing said refrigerant comprises a rotary compressor.

31. The system of claim 20 wherein each said first and second means for transporting said produce comprises:
a conveyor belt which extends from one end of the air tunnel to the other; and
means for driving said conveyor belt.

32. The system of claim 31 wherein each said conveyor belt comprises a plurality of separate segments, each segment resting on a portion of an adjacent segment along one longitudinal edge thereof.

33. An air chamber for dehydrating produce comprising:
a plurality of insulated panels which are joined together to form the top, bottom, sides and ends of the air chamber, each said insulated panel comprising an outer and inner surface constructed from an essentially rigid, rust-resistant material and having an insulating material enclosed between said outer and inner surfaces, and wherein the insulated panels which form the ends of said air chamber are spaced from the insulated panel which forms the bottom thereof so as to provide a space through which said produce may enter and exit the air chamber at opposite ends thereof;
means for dividing the interior of said air chamber into an upper chamber and a lower chamber, said upper chamber having openings positioned at opposite ends thereof to permit circulating air to enter and exit the lower chamber, thus permitting air to circulate between the upper and lower chambers in a generally circular, elongated flow path which is essentially parallel to the direction in which produce is transported through the air chamber;
conveyor means for transporting said produce through said lower chamber from one end of said lower chamber to the other end thereof;
a plurality of essentially resilient flaps located at each said space through which said produce enters and exists said air chamber, said flaps confining the air flow within which the air chamber so as to essentially enclose the air chamber with respect to the air circulated therein;
means for forcing the air to circulate from said upper chamber, through said lower chamber both above and below said conveyor means in a direction generally parallel to the direction in which said produce is transported and back to said upper chamber; and
means for heating the circulating air.

34. The air chamber as defined in claim 33 wherein said means for heating the circulating air comprise a gas-fired burner positioned in said upper chamber.

35. The air chamber of claim 34 wherein said upper chamber further comprises an air intake conduit which essentially surrounds said burner.

36. The air chamber of claim 33 wherein said means for heating the circulating air comprises:
means for storing a high pressure liquid refrigerant;
means for reducing the pressure of said liquid refrigerant so as to vaporize the refrigerant, said means for reducing pressure having an inlet and an outlet, said inlet being connected by a first conduit to said means for storing the refrigerant;
an evaporating coil having an inlet and an outlet, the inlet of the evaporating coil being connected to said means for reducing pressure, said evaporating coil being positioned at the opening in the end of said upper chamber through which the circulating air exits from said lower chamber to said upper chamber;
means for compressing said refrigerant, said means for compressing having an inlet and an outlet, the inlet of said means for compressing being connected by a second conduit to the outlet of said evaporating coil; and
a condensing coil having an inlet and an outlet, the inlet of the condensing coil being connected through a third conduit to the outlet of said means for compressing the refrigerant, the outlet of said condensing coil being connected through a fourth conduit to said means for storing the refrigerant, said condensing coil being positioned at the opening in the end of said upper chamber through which the circulating air enters the lower chamber from the upper chamber.

37. The air chamber of claim 36 wherein said means for compressing said refrigerant comprises a rotary compressor.

38. The air chamber of claim 33 wherein said means for transporting said produce comprises:
a conveyor belt which extends from one end of said air chamber to the other; and
means for driving said conveyor belt.

39. The air chamber of claim 38 wherein said conveyor belt comprises a plurality of separate segments, each segment resting on a portion of an adjacent segment along one longitudinal edge thereof.

40. The air chamber of claim 39 further comprising means for washing and scraping said conveyor belt to remove any produce stuck to said conveyor belt after the produce has been transported through said air chamber and removed from said conveyor belt.

41. In a dehydrating system having a plurality of air chambers placed end-to-end, each air chamber comprising means for dividing the interior of the air chamber into an upper and a lower chamber, a continuous conveyor means running through said lower chamber, and means for essentially enclosing each air chamber one from the other as to air circulating therein, a method of dehydrating produce comprising the steps of:
forcing air to circulate in each said air chamber from one end of said upper chamber into said lower chamber, through the length of said lower chamber both above and below said conveyor means, and back to said upper chamber at the other end thereof;
heating said air as it is circulated from the upper to the lower chamber;
transporting said produce through the lower chamber of each said air chamber in a direction generally parallel to the air circulated through said lower chamber, thereby dehydrating said produce; and selectively expelling a portion of the moisture-laden air returned from said lower chamber to said upper chamber of each air chamber.

42. The system as defined in claim 41 further comprising the step of separately adjusting the air temperature of one or more said air chambers.

43. A method as defined in claim 41 wherein the air circulated in at least two adjacent air chambers is circulated in a direction opposite one with respect to the other.

44. A method as defined in claim 41 further comprising the steps of:

placing a plurality of air chambers end-to-end to form a second elongated air tunnel and wherein each said air tunnel is placed end-to-end; and automatically turning said produce over as it leaves one said air tunnel and enters the other said air tunnel.

* * * * *